Dec. 10, 1940.                T. B. COOPER                2,224,501
         APPARATUS FOR THE RECLAIMING AND REFINING OF WHITE METALS
                    FROM DROSS, SKIMMINGS, AND SCRUFF
                       Filed Aug. 13, 1937        2 Sheets-Sheet 1
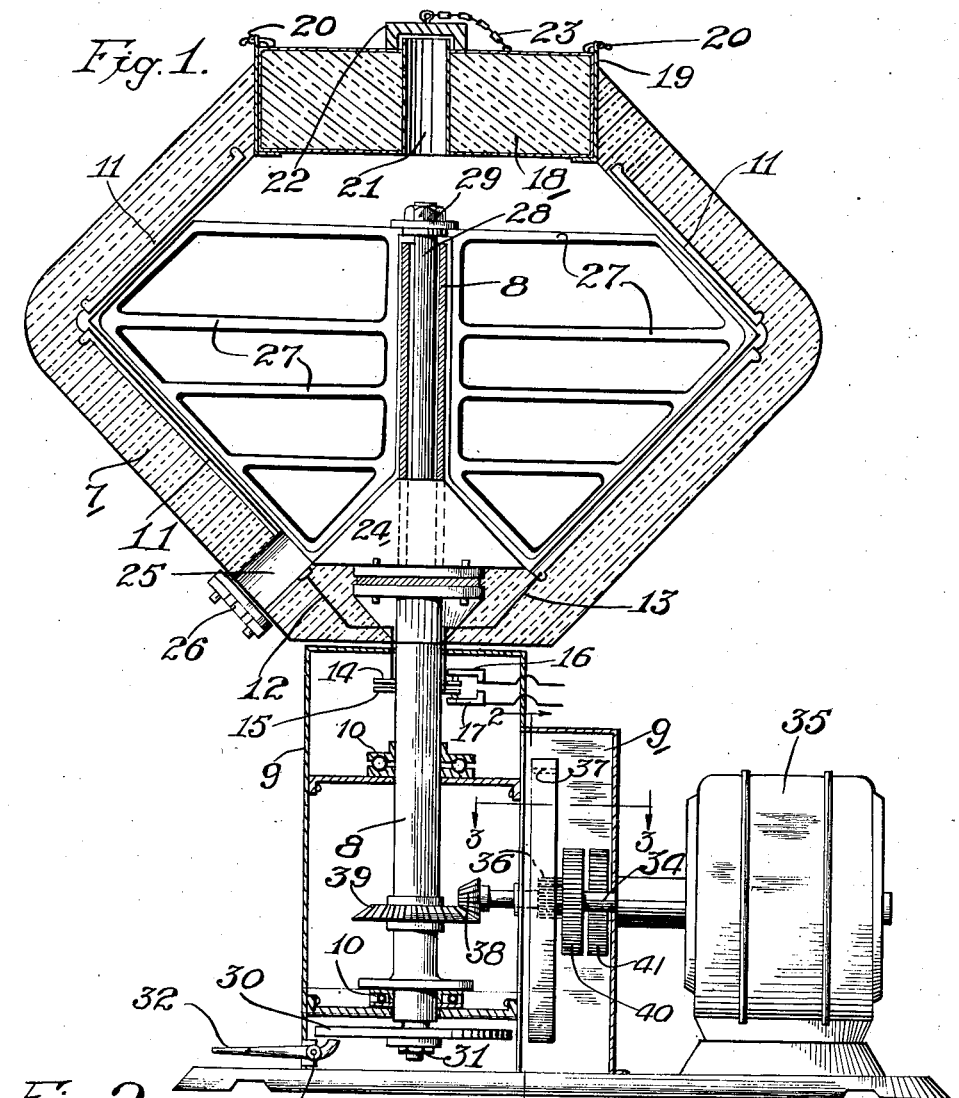
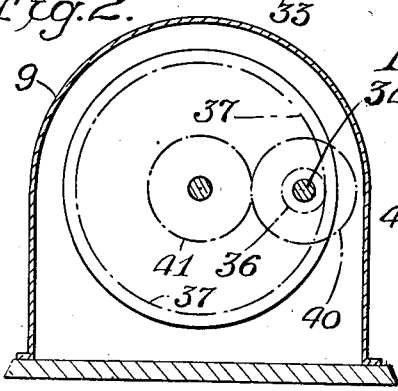
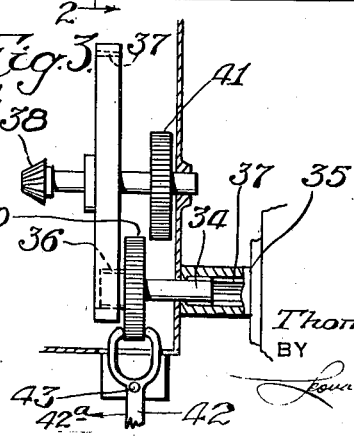
INVENTOR
Thomas B. Cooper
BY
Leonard L. Kalish
ATTORNEY

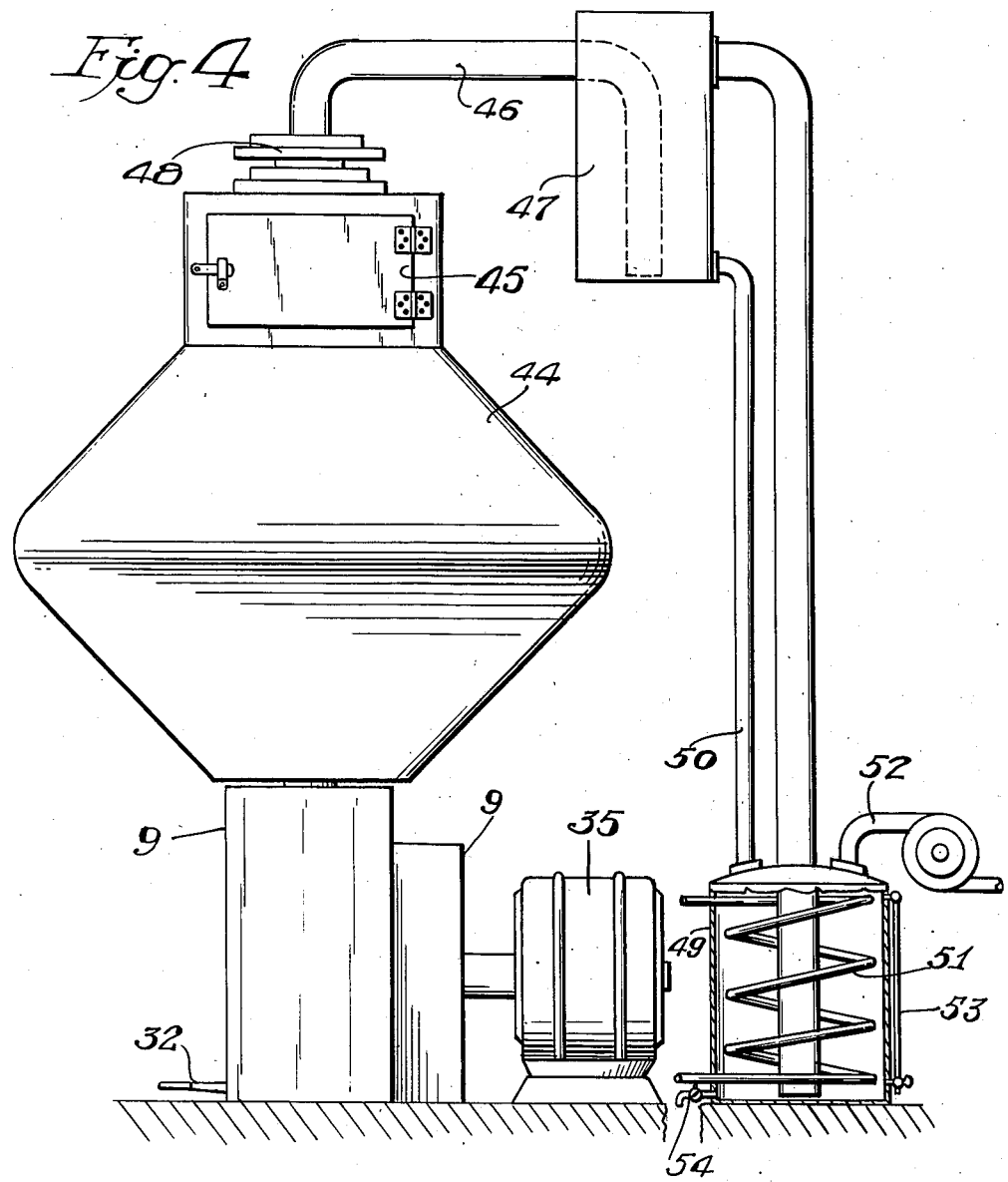

Patented Dec. 10, 1940

2,224,501

UNITED STATES PATENT OFFICE 2,224,501

APPARATUS FOR THE RECLAIMING AND REFINING OF WHITE METALS FROM DROSS, SKIMMINGS, AND SCRUFF

Thomas B. Cooper, Philadelphia, Pa., assignor of one-half to Philip N. Bernheimer Application August 13, 1937, Serial No. 158,836

3 Claims. (Cl. 266—18)

The present invention relates to means for recovering so-called white metals, such as tin, lead, zinc, antimony and bismuth, from skimmings or so-called dross or scruff, from melting pots containing such white metals in various industrial processes, as for instance from terne pots, galvanizing pots, or tin pots in tin plate plants or type metal melting pots in type-setting or printing plants, and various other plants where white metals are used and applied in a molten state.

Due to the comparatively ready oxidation of most of these white metals, particularly when in a molten state, and due also to the introduction of impurities such as iron into the molten mass, as for instance in the tinning pots or "baths" in a tin plate plant, a substantial and economically significant amount of oxides and iron-laden impure materials result in such industrial processes which contain available white metals.

It is an object of the present invention to provide apparatus for recovering or reclaiming or separating entrained white-metal contents of drosses, skimmings, oxides, residues or so-called scruffs and scraps of such white metals.

The apparatus of the present invention is particularly useful in the separation of the white metal content of various scruffs, skimmings, drosses, residues or the like. Thus, to take one specific example it is adapted for a separation of the white-metal content of tin scruff, which scruff results commercially in the following manner.

In a tin plate plant, the tinning pots of the standard type are divided in their upper portion by a partition which extends below the level of the surface of the "bath" to a point short of the bottom of the pot.

The side of the pot at which the sheets to be coated are entered is termed the "low side." The sheets are passed under the partition and emerge upwardly from the pot through the molten bath at the side which contains the palm oil. The compartment containing the palm oil is termed the "grease pot," or "high side," of the pot, the oil level of this side being higher than the metal level of the bath because of the light weight of the palm oil compared to the weight of the metal.

The rapid entry of the cold sheets into the molten metal chills the metal, thereby rendering necessary the use of a flux such as zinc chloride to maintain fluidity of the bath. The flux floats on the surface of the metal bath and constitutes an ingredient of the scruff in the low side of the pot, and is known as the "flux scruff." Partially oxidized metal formed by air being drawn into the bath by the rapidly entering sheets, and the particles of iron that become detached from the sheets, constitute a major portion of this flux scruff.

In the "grease pot," or "high side" of the pot, the scruff composed of partially oxidized metal and particles of iron that are carried over by the sheets in their passage through the bath, is known as the "oil scruff."

A third scruff is termed the "bottom scruff," or "heavy metal" and consists largely of minute particles of iron held in suspension in the body of the metal bath at tinning temperatures, which are in the neighborhood of 610 deg. Fahr. to 635 deg. Fahr.

The generic term "scruff" as applied to the skimmings as a whole from the tinning pots is a dirty, greasy, conglomerate mess of free tin and partially oxidized tin contaminated with metallic impurities and entrained with a variety of extraneous substances such as zinc chloride, soda ash, bran, palm oil, hydrochloric acid, minute iron particles, iron oxide and tramp iron such as bolts, nuts and washers, rubbish, etc., etc. The complex nature of the scruff, therefore, presents many problems when attempting to separate the entrained tin from the extraneous matter, even after the partially oxidized tin has been deoxidized and all converted into free tin, because of the surface tension of molten tin in contact with viscous greasy substances. The minute globules of molten tin cannot be successfully totally separated from such extraneous matter by present apparatus or methods.

Ordinarily, the "flux scruff" is skimmed as it is formed from the surface of the bath in the low side of the tinning pot.

The "oil scruff" is removed periodically from the surface of the bath in the high side of the tinning pot after first removing the palm oil bath by draining the grease pot and withdrawing the mechanism that conducts the sheets through the oil.

Heretofore, the scruff of all kinds has been remelted to recover the tin content in reverberatory or other furnaces, but the operations have been expensive and the percentage of the total tin content of the scruff recovered has not been sufficiently high. Furthermore, the recovered tin has not been of sufficient purity necessary for its re-use in the process of tinplating, although it has been found suitable for other uses.

The apparatus as shown in the accompanying drawings is designed to permit of the treatment of complex tin scruff resulting for example from the hereinabove described industrial practice and similar complex drosses, residues or skimmings, as well as other drosses, scraps and residues from metals having a comparatively low fusion point, such as the so-called "white metals," in a non-oxidizing atmosphere without combustion of inflammable gases or vapors resulting from the working of the process. This condition may be created, 1. In a chamber from which a large part of the oxygen content of the atmosphere is removed, 2. In a closed vessel wherein internal pressure has been created to exclude the atmosphere.

3. By the introduction into the treatment chamber of inert gases such as carbon dioxide, helium, nitrogen, steam, etc.

4. By covering the material under treatment with an insulating agent to protect it from the atmosphere during treatment.

5. By various combinations of the foregoing methods.

The primary purpose of the treatment of the metal to be de-oxidized and/or purified and/or separated out of contact with the atmosphere, is to prevent further oxidation by contact with the atmosphere and to prevent combustion of the inflammable gases and vapors within the treating chamber resulting from the working of the process, thus reducing danger of explosions; preventing volatilization of the metal under treatment; maintaining fluidity of the metal-treating agents thus effecting the release of entrained metal from heavy viscous extraneous matter.

The treatment in a partial vacuum, internal pressure, or a non-combustible atmosphere avoids carbonizing or coking the materials in the treating chamber, thereby facilitating the maintenance of a proper degree of fluidity whereby the entrained metallic content of the scruff dross, residue or skimming is released and gravitates to the molten bath. This fluidity may also be controlled by controlling the viscosity of such admixtures as may be used in the treating chamber. Thus, if the admixture where used becomes too viscous from re-use or otherwise, fresh quantities of the admixture can be introduced, in addition to the light recovered condensate, to dilute the re-used admixture to maintain fluidity for the purpose described above.

Referring to the drawings in which like reference characters indicate like parts:

Figure 1 represents a front view, partly in elevation and partly in section, of an apparatus for reclaiming metals from scruff and the like, said apparatus being normally adapted to operate under a slight internal pressure, and constituting one embodiment of the present invention.

Figure 2 represents a section taken on line 2—2 of Figure 1, looking in the direction of the arrows.

Figure 3 represents a section taken on line 3—3 of Figure 1, looking in the direction of the arrows.

Figure 4 represents a schematic elevational view of an apparatus for separating entrained substances from gases and vapors conducted from the upper section of a metal-reclaiming heating chamber operating under vacua, for condensing the condensible gases and vapors, and for discharging the non-condensible gases and vapors to the atmosphere.

The metal-reclaiming apparatus illustrated in Figure 1 normally operates under a slight internal pressure and is intended for use in reclaiming metals from dry dross or residue obtained from type metals, solders, bearing metals and the like;—such dross or residue containing no moisture and accordingly not foaming or frothing when heated or agitated even in the presence of deoxidizing agents.

The metal-reclaiming apparatus includes a dross-receiving rotatable metal chamber externally insulated and mounted in an upright position, electrical heating elements preferably imbedded within the external insulation and in contact with the metal chamber wall, and circumferentially distributed thereabout, rotary agitating or stirring means mounted within said chamber in coaxial relation thereto and capable of independent rotation relative to said rotatable chamber, means for simultaneously rotating said chamber and said agitating means, and braking means for retarding the rotation of said agitating means relative to said chamber.

The heating chamber 7 may be mounted upon an upright sleeve 8, supported relative to the housing 9 by means of the ball-bearings 10, 10. Electrical heating elements 11, 11 are preferably imbedded within the refractory lining of the chamber walls in contact with the metal chamber wall and are connected to the external electric power supply source through the leads 12 and 13, the slip rings 14 and 15, and the brushes 16 and 17. If desired, alternative heat generating means may be substituted for these electrical heating elements 11, 11. A relatively heavy lid 18 rests within the angle iron frame 19 which defines the charge-receiving opening at the top of the heating chamber 7, and this lid 18 may be additionally secured in its operative position by means of the snap-catches 20, 20.

The lid 18 may also be provided with the central vertical aperture 21 loosely capped with a small relatively heavy removable cap 22 anchored to the lid 18 through the chain 23. This central aperture 21 and its cap 22 jointly function as a pressure relieving means and prevent the accumulation of dangerously high pressures within the heating chamber. Thus, the weight of the cap 22 may be so proportioned as to permit the internal heating-chamber pressure occasioned by the high chamber temperature to build up to any desired degree beyond which the force exerted by the internal pressure on the underside of the cap will be sufficiently great to lift the same from its aperture-closing position and thus permit a decrease in chamber pressure. If desired, any of the many well-known safety pressure-relief valves may be substituted for the foregoing lid aperture and cap arrangement.

A centrally disposed frusto-conical portion 24 preferably constitutes a bottom portion of the heating chamber 7 and assists the gravitational discharge of the final molten metal through the substantially large-sized drain opening 25 which may be capped by the readily removable flange 26, or by any other suitable means.

A multi-vaned spider-framed agitator 27 is preferably coaxially mounted within the rotatable heating chamber 7, and independently thereof. Thus, the agitator 27 may be rigidly secured to the upper end of its rotatable supporting shaft 28, which is disposed within the interior of and in spaced relation from the rotatable chamber-supporting sleeve 8, by means of the threaded nut and washer assembly 29 illustrated in Figure 1 or by any other suitable means. A brake disc 30 may be fixedly secured to the lower end of the agitator-supporting shaft 28 through the threaded nut and washer assembly 31 or any equivalent thereof, said brake disc being adapted to rotate simultaneously with the agitator 27. A brake pedal 32, pivotally related to the housing 9 at the pivot point 33, may contact the underside of the brake disc 30 through the inner upturned pedal extremity, and thus provide agitator speed control means.

The driving power necessary for rotating the heating chamber 7 may be transmitted from an electric motor 35 (which may have variable speed characteristics) through the dual ratio gear train illustrated in plan in Figure 3, and in side elevation in Figure 2. This gear train is illustrated in Figure 3 in its low speed position, and may be seen to consist of the gear 36 which is driven directly by the splined electric motor shaft 37 through the axially shiftable stub shaft 34, and this driven gear 36 in turn meshes with and drives the internal ring gear 37 which transmits its imparted rotary movement to the bevel pinion gear 38, which in turn drives the meshing ultimate bevel gear 39 rigidly secured to the chamber-supporting rotatable sleeve 8. The gears 40 and 41 are out of mesh in this low speed position, but when the bifurcated shift lever 42, which is pivotally related to the housing 9 at the pivot point 43, is thrown in the direction of the arrow 42—a into the high speed position, then these gears 40 and 41 mesh with each other and gears 36 and 37 unmesh, and in this position the bevel pinion gear 38 is driven at a faster speed and the speed of rotation of the heating chamber 7 is accordingly increased, without any corresponding increase in the speed of the driving motor.

In operation, the weighted lid 18 is removed from its chamber-closing position and the interior of the heating chamber 7 is charged with the dross or the like and with such deoxidizing and refining admixtures as may be necessary or desirable. The weighted lid 18 is then replaced in its position within the angle iron frame 19, care being taken to see that the weighted cap 22 covers the central lid aperture 21. The temperature of the mass may then be elevated to a point at or slightly above the melting point of the metal to be reclaimed from the dross, by passing a controlled electrical current through heating elements 11, 11, and this melting temperature is maintained until the dross has melted.

This heating of the charge raises the internal chamber pressure by the slight amount most desirable for best results.

The gear train is then set in the low speed position (as illustrated in Figure 3), and the motor 35 is started, thus rotating the heating chamber 7 at the slow speed. Simultaneously, therewith, the spider-webbed agitator 27 may be held stationary within the rotating heating chamber 7 by applying braking pressure between the brake pedal 32 and the brake disc 30. This causes the agitator to stir the charge and establish intimate contact between the dross or the like and any deoxidizing admixture that may be present, and also maintains the formed sludge or mixture in a broken-up condition, thus releasing excess free metal which gravitates to the bottom of the heating chamber and there forms a bath of molten free metal. When the metallic content of the dross has been thoroughly melted, deoxidation has been accomplished, and this condition may be tested for by noting the ease with which the relatively stationary or relatively slow moving agitator passes through the revolving material within the rotating heating chamber.

The remaining free molten metal mechanically entrained in this revolving sludge or mixture may then be extracted by throwing the gear shift lever 42 in the direction of the arrow 42—a into the high speed position. The resulting centrifugal forces created lift the collected molten metal from the bottom of this chamber to a vertical plane and thrust it radially against the projecting mid-section of the rotating melting chamber 7, and the entrained molten metal which is then centrifugally thrown radially outwardly joins the lifted revolving mass of molten metal. The agitator 27 may be held stationary for brief periods during high speed rotation, and in this fashion achieves as complete a separation of the free molten globules of metal from the charge, as would be obtainable only by a considerably increased chamber rotational speed. Moreover, the normal conversion of the sludge or other residue into a hard packed mass, such as would ordinarily accompany the high-speed chamber rotation even when the mass is subjected to a high chamber temperature, is prevented by the splashing and agitating action of the intermittently retarded spider-webbed agitator on the sludge or mixture, and in this fashion the material is maintained in a broken-up condition, thus facilitating the complete removal of all entrained metal.

The intermittent retardations of the agitator 27 may now be eliminated, whereupon the rapidly revolving mass of material will act upon the webs of the freely rotatable agitator 27 to rotate the same at a speed substantially equal to that of the speed of revolution of the enclosed material. The power may then be shut off and the machine permitted to come slowly to rest. As the speed decreases, the heavier free molten metal, which had been centrifugally thrust against the projecting mid-section of the chamber 7, gravitates to the frusto-conical bottom of the heating chamber and the lighter residues flow to the upper surface of the molten bath. The molten metal may now be gravitationally discharged from the now stationary chamber through the relatively large-sized discharge aperture 25—the sloping bottom-forming frusto-conical member 24 assisting this gravitational flow (which would normally be retarded by the presence of even a small percentage of ferrous particles in the molten metal were the chamber bottom horizontal instead of inclined).

The apparatus schematically illustrated in Figure 4 may be operatively associated with a reclaiming apparatus similar in all respects to that illustrated in Figure 1 but with the substitution of the chamber top 44 and its associated equipment, including a vacuum pump, in lieu of the lid 18. The arrangement illustrated in Figure 4 is preferably used when metal is being reclaimed from wet scruff or skimmings, for in that case moisture is present which tends to retard the heating of the mass within the chamber, and moreover ebullition of the charge ordinarily accompanies the heating and agitating thereof.

Subjecting the interior of the heating chamber to a sub-atmospheric pressure permits of a more rapid elevation of the temperature of the material within the chamber to the desired upper limit, by effecting the removal of moisture present in the wet scruff, skimmings or the like. Furthermore, the existence of such sub-atmospheric pressure within the heating chamber assists in the removal of froth which forms within the top of the heating chamber, further assists in the separation of entrained substances from the gases and vapors conducted away from the upper section of said heating chamber, further assists in condensing the condensible gases and vapors (the condensate then being available for subsequent reuse as deoxidizing material in cases wherein deoxidizing materials are used initially) and further effects the final discharge of the non-condensible gases and vapors to the atmosphere.

The chamber top section 44 of the heating chamber illustrated in Figure 4 has ample capacity to accommodate the froth or foam, and thus prevents its escape. The chamber top 44 may be provided with an air-tight charging-door 45 disposed near the upper end thereof, and is preferably connected to a separator 47 by means of a conduit 46, which conducts and discharges froth and vapors in close proximity to the bottom of said separator. The coacting inlet end of the conduit 46, which is held stationary, and the outlet of the rotating chamber top 44, may be sealed against the admission of air therebetween, by means of any suitable stuffing box or packing 48. Any liquid which is separated from the froth within the separator 47 may flow directly into the condensate-collecting chamber 49 through the conduit 50, while the lighter fractions rise to the top of the separator 47 and are led therefrom to the bottom of the condensate-collecting chamber 49 and are there condensed by the condensing coil 51. The noncondensible gases and vapors which rise to the top of the condenser chamber 49 are then discharged through the discharge conduit 52 to the atmosphere. A vacuum pump which is preferably operatively interposed at an intermediate point along said conduit 52, may be utilized to maintain sub-atmospheric pressure in the condenser, separator, associated conduits and heating chamber, and this vacuum pump may be further utilized to discharge the non-condensible gases and vapors to the atmosphere.

The level of the condensate collected within the condenser chamber 49 may be conveniently indicated by means of the glass indicating column 53. When a sufficient quantity of condensate has collected, the draw-off cock 54 may be opened and the discharged condensate collected and reused if desired to de-oxidize subsequent scruff, skimmings and the like.

Having thus described the invention what is hereby claimed as new and desired to be secured by Letters Patent is:

1. In white-metal recovering apparatus, a chamber rotatable about a generally upright axis of rotation and adapted to be charged with metalliferous material, said chamber having means for excluding free access of atmospheric oxygen and having a bottom provided with an inclined draining portion extending from a point substantially below the top of the chamber and above the lowermost point of said bottom, to said lowermost point of said bottom, means for rotating said chamber, a free-swinging stirrer rotatably mounted inside said chamber in substantial co-axial relation thereto and adapted to be rotated by the rotary movement of the material in said chamber, and means externally of said chamber for retarding the rotation of the stirrer at the will of the operator thereby to agitate the material in said chamber.

2. In white-metal recovering apparatus having a closed rotatable heating chamber adapted to be charged with wet metalliferous material which ebulliates upon heating, a stationary conduit leading from the top of said chamber, said conduit being in sealed communication with said chamber top, an entrainment separator connected with said conduit, two conduits leading from said entrainment separator to a condenser, one of said conduits leading from the bottom of said separator to said condenser for conducting liquids separated from the ebullient material in said separator directly to said condenser, and the other of said two conduits leading from the top of said separator to said condenser for conducting the lighter fractions of said ebullient material to said condenser, and a conduit leading from the top of said condenser to the inlet end of a vacuum pump.

3. In white-metal recovering apparatus, a heating chamber rotatable about a generally upright axis of rotation and adapted to be charged with metalliferous material, said heating chamber being capable of excluding atmospheric oxygen, means for rotating said chamber, free-swinging agitating means rotatably mounted inside said chamber in substantial co-axial relation thereto and adapted to be rotated by the rotary movement of the material in said chamber, and means for retarding the rotation of said rotated agitating means at the will of the operator, thereby to agitate the material in said chamber.

THOMAS B. COOPER.